Sept. 26, 1933.  E. McCORMICK  1,928,109
TRACTOR
Filed Feb. 25, 1932

WITNESS
WALTER ACKERMAN.

INVENTOR.
Elmer McCormick.
BY Brown, Jackson,
Boettcher & Dienner
ATTORNEYS.

Patented Sept. 26, 1933

1,928,109

UNITED STATES PATENT OFFICE 1,928,109

TRACTOR

Elmer McCormick, Waterloo, Iowa, assignor to John Deere Tractor Company, Waterloo, Iowa, a corporation of Iowa Application February 25, 1932. Serial No. 595,060

9 Claims. (Cl. 308—207)

The present invention relates to tractors and has more particularly to do with the power take-off mechanism thereof.

As is generally known, tractors are now extensively used in farming operations for propelling various implements, and such tractors are provided with power take-off mechanism whereby power may be transmitted from the tractor motor to operate various moving parts on such implements, such for example, as the harvesting and threshing parts of combines, the seed feeding mechanisms of planters, the apron and beater cylinders of manure spreaders, etc. In such power take-off assemblies it is desirable to provide means for adjusting the bearings for the gear on the inner end of the power shaft to take up for wear, and the principal object of my present invention is to provide improved means for adjusting said bearings and locking said means in any adjusted position.

Another object of the invention is to provide a nut screw-threaded on said gear for adjusting said bearings and means for binding the threads of the nut on the threads of the gear for locking said nut in any adjusted position to which it may be set.

A further object of the invention is to provide secondary or supplemental locking means to prevent turning movement of the nut from its adjusted position on the gear should the first mentioned locking means become loosened and ineffective during operation of the power take-off mechanism.

Other objects and advantageous features will be apparent from the following description of the preferred embodiment of my invention taken in connection with the accompanying drawing, in which.

Figure 1:
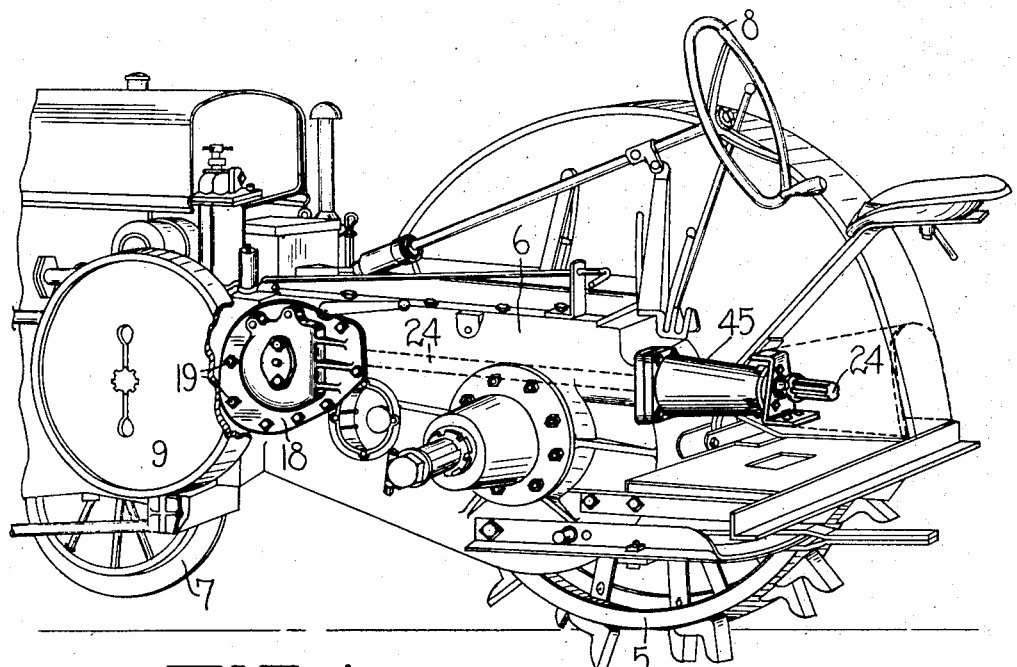
Figure 1 is a fragmentary view of a tractor illustrating the position of the power shaft of the power take-off mechanism with respect to the other parts of the tractor, and the cover plate which carries part of the gear assembly of the power take-off mechanism.

In Figure 1 a commercial form of farm tractor such as are now in extensive use has been fragmentarily illustrated, and the same will be briefly described. The tractor is driven by a pair of drive wheels at the rear, one of which is illustrated and indicated by the numeral 5, which drive wheels are driven from the engine of the tractor through suitable transmission devices enclosed within the transmission housing 6. The front portion of the tractor is supported on dirigible wheels, one of which is illustrated and indicated by 7, and said wheels are steered by the hand steering wheel 8. The numeral 9 indicates the fly wheel of the engine.

Figure 2:
Figure 2 is an enlarged fragmentary cross-sectional view with some parts in elevation, illustrating the gear assembly of the power take-off mechanism and my improved adjusting and locking mechanism for the bearings of the gear at the inner end of the power shaft.

The power take-off mechanism comprises a spur gear 11 which is splined on the shaft of or otherwise driven by the transmission mechanism (not shown). The gear 11 meshes with a pinion 12 formed integral with the hub 14 of bevel gear 15 rotatably mounted on a stub shaft or axle 17 carried by and extending inwardly from the closure plate 18 secured by bolts 19 to the side wall of the transmission housing 6. Conical roller bearings 20 are interposed between the gear and the stub shaft adjacent the cover plate 18 as shown in Fig. 2. Meshing with said bevel gear 15 is a second bevel gear 21 provided with an integral elongated hub portion 22 having internal splines 23 engaging between external splines 23a provided on the inner end of the power take-off shaft 24 which extends longitudinally within the transmission housing 6.

The bevel gear 21 is supported by a suitable bracket 25 formed integral with and extending inwardly from the cover plate 18 so as to position the axis of the bevel gear 21 within the housing 6 in alignment with the axis of the power take-off shaft 24 on which it is splined. The hub of the bevel gear 21 is enclosed within a cylindrical housing member 26 secured by any suitable means to and supported by or formed integral with the bracket 25. A pair of conical bearing races 27 and 28 are provided on the hub 22 adjacent opposite ends thereof, and conical bearing races 31 and 32 are provided on the inner side of the cylindrical housing 26 adjacent the opposite ends thereof, and a series of roller bearings 33 and 34 are positioned respectively between the races 27 and 31 and the races 28 and 32, whereby suitable bearing support is provided for the bevel gear 21 on the inner end of the power shaft 24 within the housing 26. The bearing race 32 is carried in position in the cylindrical housing 26 by a suitable bearing cage 35 secured, as hereinafter described to the housing 26 and bracket 25, the forward edge of the cage abutting against the outer bearing race 31 and thereby determining the position thereof relative to the bearing race 32.

For adjusting the bearings 33 and 34 of the bevel gear 21 I provide a nut 36 threaded on the rear end of the hub 22 of said gear (the right hand end as shown in Figure 2), said nut abutting against the conical bearing race 28 whereby by turning the nut on the hub to move it to the left as shown in said figure the bearings may be adjusted or tightened to take up for wear.

Figures 3, 4:
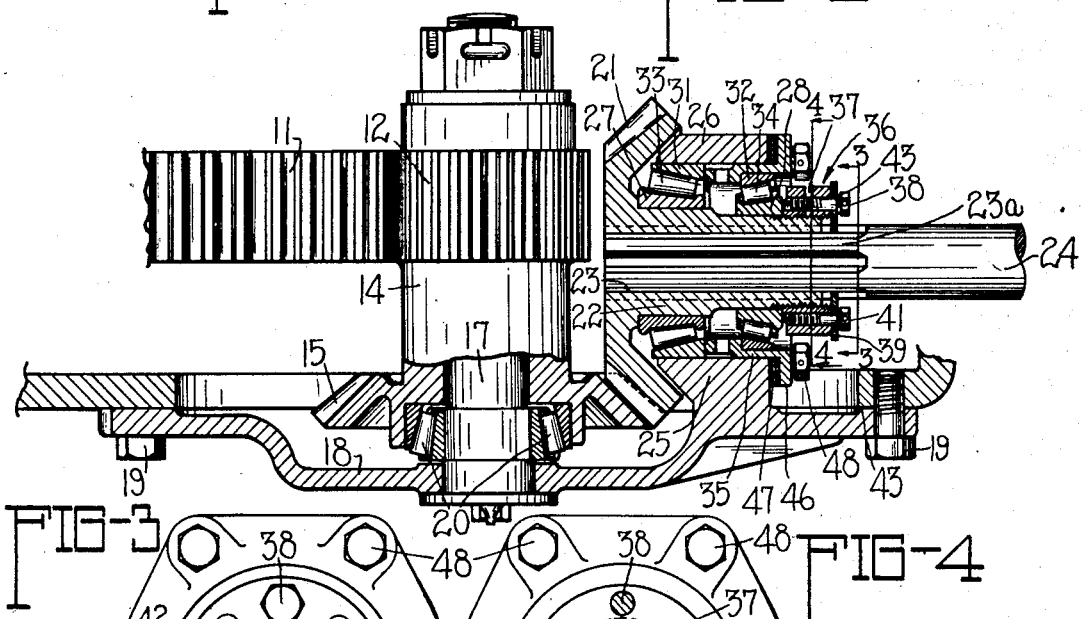
Figure 3 is a cross-sectional view taken on the plane of the line 3—3 of Figure 2.
Figure 4 is a cross-sectional view taken on the plane of the line 4—4 of Figure 2.

The nut 36 is split at one side of its axis, as indicated at 37 in Figures 2 and 4, and a screw 38 is provided extending through the nut on either side of the split portion, so that when the bearings have been properly adjusted by turning the nut 36 on the hub, said nut may be locked to the hub by tightening the screw 38, which draws the split portions of the nut toward each other thereby binding the threads of the nut on the threads of the hub, as will be readily understood.

To further assure that the nut will not turn on the hub and move from the position to which it has been set in the adjustment of the bearings should the screw 38 become loosened during operation of the power take-off mechanism, thereby releasing the threads of the nut from their binding action on the threads of the hub, I provide a washer 39 which is normally clamped tightly to the outer face of the nut 36 by the head of the screw 38 and the head of a second screw 41 threaded into an opening provided in the nut 36 diametrically opposite the opening which receives the screw 38. The washer 39 is provided with internal splines 42 which engage with the splines 23a of the power take-off shaft 24 so that said splines coact with each other to hold the washer against turning relative to said shaft. Lock nuts in the form of locking spring washers 43 are positioned on the screws 38 and 41 between the heads thereof and the washer 39 whereby said screws are locked tightly in position in said nut, as will be readily understood.

As turning of the washer 39 relative to the shaft is prevented by the coacting splines, even when the washer is not clamped tightly against the outer face of the nut 36 as above described, the nut is held against turning on the hub even though the screw 38 should become loosened to an extent that the threads of the nut are no longer held in binding engagement with the threads on the hub 22. As shown in Figure 3, the washer 39 is provided with eight holes 45' so that the holes in the nut which receive the screws 38 and 41 will line up with a pair of holes in the washer every 45°, whereby supplemental locking means is provided for the nut when it is turned for relatively fine adjustments of the bearings.

In order to keep the teeth of the bevel gear 21 properly in mesh with the teeth of the bevel gear 15 at all times regardless of the adjustment of the bearings, which adjustment may move said teeth out of proper meshing engagement, the bearing cage 35 before mentioned is provided with an outwardly extending flange 46 overlapping the rear edges of the cylindrical housing 26 and the bracket 25 which supports said housing, and shims 47 are inserted between said flange and said rear edges of the housing and bracket, as shown in Fig. 2. Said shims may be either in the form of whole shims or split shims as desired. Screws 48 extending through said flange 39 and into said cylindrical housing and bracket operate to hold said bearing cage securely in position. The bearing cage together with the complete bearing assembly and the bevel gear 21 may be adjusted longitudinally along the power take-off shaft to move said gear toward the bevel gear 15 by loosening the screws 48, removing one or more of the shims, and then tightening said screws, or the same may be adjusted along said shaft in the opposite direction by inserting one or more additional shims, as will be readily understood.

As above mentioned, the power take-off shaft 24 extends rearwardly through the interior of the transmission housing to the rear end thereof, as shown in dotted lines in Fig. 1, and a suitable sleeve 45 is bolted to the rear wall of the transmission housing in alignment with the opening through which the power take-off shaft extends, the rear end of said shaft being journaled in and extending through said sleeve as shown.

While I have shown my improved adjusting and locking means for the bearing incorporated in a power take-off assembly for tractors, it is to be understood that my invention is not necessarily limited to use in connection with such mechanism, as it may be used in connection with any other mechanisms for which it is adapted, and the claims hereinafter made are therefore to be construed accordingly. Also my improved initial locking means including the split nut and the means for drawing the split portions thereof together is not limited to use in connection with a gear splined on a shaft, as it is equally applicable for use in connection with a gear secured to a shaft by any other suitable means.

I also wish it to be understood that the secondary locking means may be used separately and apart from the first locking means in a construction wherein a gear is splined on a shaft, as the splined washer secured to an ordinary nut without a split therein may be used to lock the nut in any adjusted position on the hub of the gear, as the interlocking of the internal splines in the washer with the external splines on the shaft will prevent turning of the nut from any position to which it may be adjusted. The claims hereinafter made, therefore, are not to be limited to the use of a nut with a split therein whereby the split portions of the nut are drawn together to lock the nut in position on the threads of the hub, unless they so specifically state.

I claim:

1. The combination with a shaft, a gear having a hub member non-rotatably secured to said shaft, and bearings for said gear, of adjusting means rotatable on said hub member to move longitudinally thereof to adjust said bearings, and means non-rotatably engaging said shaft and said adjusting means, for locking said adjusting means against rotation on said hub member.

2. The combination with a shaft, a gear having a hub member non-rotatably secured to said shaft, and conical bearings for said gear, of adjusting means rotatable on said hub member for adjusting said bearings, and means non-rotatably engaging said shaft and said adjusting means for locking said adjusting means on said hub member in any adjusted position.

3. The combination with a splined shaft, a gear having a hub member splined on said shaft, and bearings for said gear, of means for adjusting said bearings comprising a nut threaded on said hub member, and means for locking said nut on said hub member in any adjusted position, said means comprising a washer overhanging the end of said hub member and having splines engaging with the splines on said shaft and means for locking said washer to said nut.

4. The combination with a splined shaft, a gear having a hub member secured to said shaft, and bearings for said gear, of means for adjusting said bearings comprising a nut threaded on said hub member, and means for locking said nut on said hub member in any adjusted position, said means overhanging the end of the hub member in non-rotatable relation with the shaft but movable longitudinally along said shaft, and a pair of bolts extending through said means for locking the same to said nut.

5. The combination with a splined shaft, a gear splined on said shaft, and bearings for said gear, of means for adjusting said bearings comprising a nut threaded on said gear, means for locking said nut in any adjusted position on said gear, and supplemental locking means cooperating with said first locking means comprising a washer overhanging the end of said gear and having splines engaging with the splines on said shaft, and means for securing said washer to said nut.

6. The combination with a splined shaft, a gear having a hub splined on said shaft, and bearings for said gear, of means for adjusting said bearings comprising a split nut threaded on said hub, means for drawing the split portions of said nut together to bind said nut on said hub, and supplemental locking means for locking said nut on said hub comprising a washer disposed adjacent the end of said hub and having splines engaging the splines on said shaft, and means for securing said washer to said nut whereby the interengaging splines prevent turning of said nut out of adjusted position on said gear.

7. The combination with a splined shaft, a gear including a hub portion splined on said shaft, and bearings for said gear, of means for adjusting said bearings comprising a split nut threaded on said gear, means for locking said nut to said gear in any adjusted position, said means comprising a bolt extending through the split portions of said nut for drawing the same together to bind said nut on said gear, and supplemental locking means cooperating with said first locking means for holding said nut in position, said means comprising a washer disposed at one end of said hub portion and having splines engaging the splines on said shaft and provided with an opening for receiving said bolt, and a second bolt positioned diametrically opposite said first named bolt and extending through said washer and said nut whereby said bolts secure said washer to said nut.

8. The combination with a splined shaft, a gear having a hub splined on said shaft, and bearings for said gear, of a nut for adjusting said bearings threaded on said gear, a washer having internal splines cooperating with the splines on said shaft, said washer abutting the outer surface of said nut and overhanging the end of said hub, and a pair of diametrically oppositely positioned bolts extending through said washer and into said nut for securing said washer to said nut whereby said washer locks said nut to said hub in any adjusted position of said nut.

9. The combination with a shaft, a gear having an elongated hub secured to said shaft, and bearings for said gear, of rotatable means on said hub for adjusting said bearings longitudinally with respect to said hub, and means for locking said first mentioned means against rotation in any adjusted position, said means comprising a member non-rotatably mounted on said shaft and overhanging the end of said hub, and means for connecting said member to said rotatable means.

ELMER McCORMICK.